United States Patent
Schuh

(10) Patent No.: US 9,015,360 B2
(45) Date of Patent: Apr. 21, 2015

(54) METHOD OF PROGRAMMING A USB DEVICE

(71) Applicant: Gemalto SA, Meudon (FR)

(72) Inventor: Jean-François Schuh, La Ciotat (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 14/370,494

(22) PCT Filed: Dec. 21, 2012

(86) PCT No.: PCT/EP2012/076625
§ 371 (c)(1),
(2) Date: Jul. 3, 2014

(87) PCT Pub. No.: WO2013/102587
PCT Pub. Date: Jul. 11, 2013

(65) Prior Publication Data
US 2014/0330987 A1    Nov. 6, 2014

(30) Foreign Application Priority Data

Jan. 5, 2012   (EP) .................................... 12305010

(51) Int. Cl.
*G06F 3/06* (2006.01)
*G06F 13/10* (2006.01)
*G06F 13/40* (2006.01)
*H04Q 11/00* (2006.01)
*G06F 13/38* (2006.01)

(52) U.S. Cl.
CPC ............ *G06F 13/387* (2013.01); *G06F 3/0671* (2013.01); *G06F 3/0635* (2013.01); *G06F 3/0607* (2013.01); *G06F 13/10* (2013.01); *H04Q 11/00* (2013.01); *G06F 13/4068* (2013.01); *G06F 13/102* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 6,012,103 A | 1/2000 | Sartore et al. | |
| 6,192,420 B1 | 2/2001 | Tsai et al. | |
| 6,249,825 B1 | 6/2001 | Sartore et al. | |
| 6,493,770 B1 | 12/2002 | Sartore et al. | |

(Continued)

FOREIGN PATENT DOCUMENTS

| | | |
|---|---|---|
| EP | 1209574 A2 | 5/2002 |
| FR | 2632110 A1 | 12/1989 |
| WO | WO 99/01820 A1 | 1/1999 |

OTHER PUBLICATIONS

USB 2.0 Specification Engineering Change Notice (ECN) #1: Mini-B Connector; Oct. 20, 2000; p. 98; http://www.usb.org/developers/docs/ecn1.pdf.*

(Continued)

*Primary Examiner* — Kris Rhu
(74) *Attorney, Agent, or Firm* — Buchanan Ingersoll & Rooney PC

(57) ABSTRACT

The invention is a method of programming a device comprising a USB® connector and a USB® chip. The USB® connector comprises first and second sets of connection pins. The USB® chip comprises a USB® interface and a programming interface. The method comprises a step of activating a selecting pin of said first set for selecting the programming interface and a step of sending programming data to the USB® chip through said second set and through the programming interface.

11 Claims, 1 Drawing Sheet

(56) References Cited

U.S. PATENT DOCUMENTS 6,925,554 B1 * 8/2005 Wright et al. ............... 712/248
2011/0087805 A1 * 4/2011 Liu et al. ..................... 710/14

OTHER PUBLICATIONS

Universal Serial Bus 3.0 Specification, Revision 1.0; Nov. 12, 2008; p. 5-14; http://www.gaw.ru/pdf/interface/usb/USB%203%200_english.pdf.*

Universal Serial Bus Micro-USB Cables and Connectors Specification, Revision 1.01; Apr. 4, 2007; p. 10; http://read.pudn.com/downloads114/doc/comm/476505/usb_20_040908/usb_20/Micro-USB_final/Micro-USB_1_01.pdf.*

International Search Report (PCT/ISA/210) mailed on Mar. 7, 2013, by the European Patent Office as the International Searching Authority for International Application No. PCT/EP2012/076625.

Written Opinion (PCT/ISA/237) mailed on Mar. 7, 2013, by the European Patent Office as the International Searching Authority for International Application No. PCT/EP2012/076625.

* cited by examiner

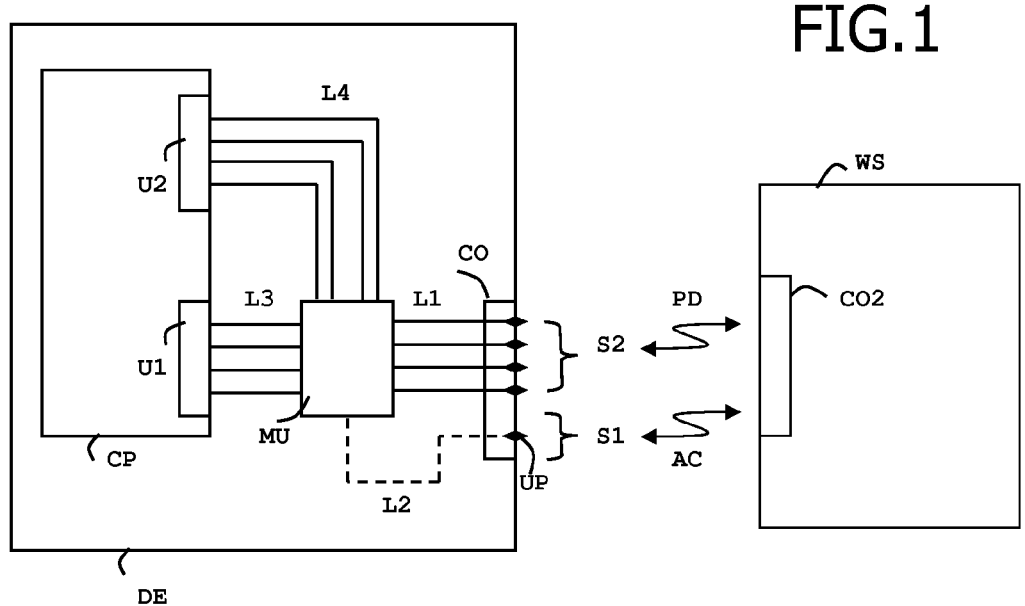
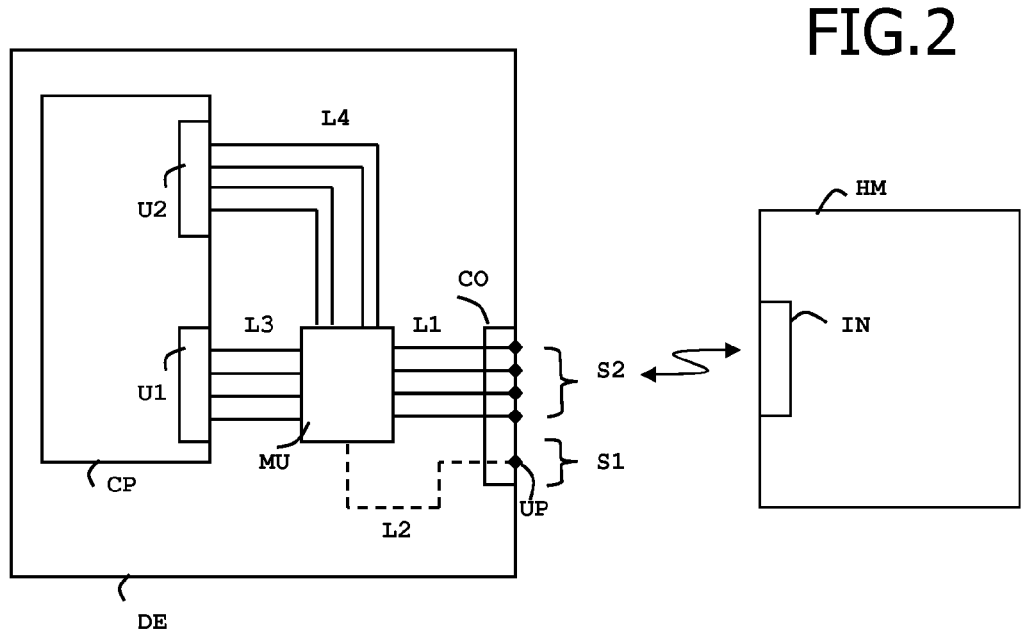

METHOD OF PROGRAMMING A USB DEVICE

FIELD OF THE INVENTION

The present invention relates to the methods for programming a USB (Universal Serial Bus) device. It relates particularly to devices comprising a standard USB connector.

BACKGROUND OF THE INVENTION

The Universal Serial Bus Specifications are available at the following address www.usb.org. For instance USB 2.0 Specifications and USB 3.0 Specifications are available on this site. These documents define an industry-standard Universal Serial Bus and describe the bus attributes, the protocol definition, types of transactions, bus management, and the programming interface required to design and build systems and peripherals that are compliant with these standards.

The USB is a cable bus that supports data exchange between a host computer and a wide range of simultaneously accessible peripherals. The attached peripherals share USB bandwidth through a host-scheduled, token based protocol. The bus allows peripherals to be attached, configured, used, and detached while the host and other peripherals are in operation.

When a USB device is manufactured, it is needed to store static data or executable data into this device. For example initialization data, personalization data or firmware may be loaded into the device during a specific step called the programming step.

For performing the programming operations, it is known to use an additional connector dedicated to the programming step. Such a dedicated connector is distinct from the standard USB connector and is used for the programming operations only. A dedicated programming tool must be used for each kind of USB device. The dedicated programming tool depends on the type of the additional connector of the device to be programmed. Moreover, the dedicated connector may become hidden when the housing is placed on the device. In this case the programming step cannot be performed with a device whose manufacture is completed.

USB standards define a specific USB class of device which is dedicated to the programming operations. This specific USB class is named Device Firmware Upgrade (DFU). A device compliant with the DFU class comprises a download means which allows storing data in a programming mode. Unfortunately, the DFU mechanism requires a dedicated firmware is already loaded in the device.

There is a need for allowing the programming step of an empty USB device without using an additional connector dedicated to the programming step.

SUMMARY OF THE INVENTION

An object of the invention is to solve the above mentioned technical problem. In accordance with the principles of the invention, the programming step is carried out through the standard USB connector of the USB device. A dedicated pin of the standard USB connector is used to select the programming interface of the USB chip into the device.

The object of the present invention is a method of programming a device which comprises a USB® connector and a USB® chip. The USB® connector comprises first and second sets of connection pins. The USB® chip comprises a USB® interface and a programming interface. The method comprises the following steps:

activating a selecting pin of said first set for selecting the programming interface, and
sending programming data to the USB® chip through said second set and through the programming interface.

Advantageously, the method may comprise the further steps:

setting the selecting pin in a deactivated state for selecting the USB® interface, and
sending an USB® message to the USB® chip through said second set and through the USB® interface.

Advantageously, the selecting pin may remain unused when the USB® chip communicates with a connected host machine through the USB® interface.

In one embodiment, the USB® connector may be a USB 2.0 Mini connector and the selecting pin may be the fourth pin of said USB® connector.

In another embodiment, the selecting pin may be the fifth pin of said USB® connector and the USB® connector may be a USB 3.0 Type A connector.

In another embodiment, the selecting pin may be the sixth pin of the USB® connector and the USB® connector may be a Micro A or Micro B plug connector.

Another object of the invention is a device comprising a USB® connector and a USB® chip. The USB® connector comprises first and second sets of connection pins. The USB® chip comprises a USB® interface and a programming interface. Said first set comprises a selecting pin. The device comprises a multiplexer adapted to route data between the programming interface and said second set of connection pins when the selecting pin is active. The multiplexer is adapted to route data between said second set of connection pins and the USB® interface when the selecting pin is idle.

In one embodiment, the USB® connector may be a USB 2.0 Mini connector and the selecting pin may be the fourth pin of said USB® connector.

In another embodiment, the selecting pin may be the fifth pin of the USB® connector and the USB® connector may be a USB 3.0 Type A connector.

In another embodiment, the selecting pin may be the sixth pin of the USB® connector and the USB® connector may be a USB 3.0 Micro A or Micro B plug connector.

Another object of the invention is a writing system comprising a microprocessor and a connector intended to connect the device of the invention. The writing system is adapted to activate the selecting pin for selecting the programming interface of the USB® chip and to send programming data to the USB® chip through said second set of connection pins.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 1 depicts schematically an example of a writing system communicating with a USB device according to the invention; and FIG. 2 depicts schematically an example of a USB host machine communicating with a USB device according to the invention.

DETAILED DESCRIPTION OF THE PREFERRED EMBODIMENTS

The invention may apply to any types of USB devices comprising a USB connector which has at least five pins. The USB connector may be a USB standard connector, a mini connector or a micro connector. The invention may also apply to USB devices compliant with further release of the above referenced USB specifications, provided that the further release is compliant with USB 2.0. In this case, the selecting pin must be selected among the connection pins which remain unused when working in USB 2.0 mode.

The invention may also apply to any types of USB devices comprising a USB connector which is not a standard USB connector (i.e. proprietary connector), like some connectors of digital cameras or mobile phones.

An advantage of the invention is to provide a USB device which may be used with currently existing USB host machines without any change on host side. The already deployed host machine may communicate with a device according to the invention through the USB protocol as usual.

Thanks to the invention, all the USB devices may be programmed via a unique programming tool.

FIG. 1 shows the architecture of a USB device DE according to an embodiment of the invention. The device DE communicates with a writing system WS.

In this example, the USB device DE is a USB mass storage device. Alternatively, the device DE may be any kind of USB device. For instance, the device DE may be a printer, a smart card, a personal assistant (PDA), a webcam, a fingerprint reader, a smart card reader, a phone, a camera, a hard disk drive or an audio device.

The USB device DE comprises a USB chip CP which has a USB interface U1 and a programming interface U2. The USB interface U1 is a conventional USB interface. The USB interface U1 is intended to be used for communicating with the USB chip CP according to USB protocol. (i.e. out of the programming step) The USB interface U2 is intended to be used for programming the USB chip CP. (i.e. during the programming step only).

The device DE comprises a USB connector CO and a multiplexer MU. The connector CO is assumed to be a standard USB connector. In other words, the connector CO is one of the connectors which are defined in the USB specifications. The connector CO comprises two sets S1 and S2 of connection pins. The first set S1 comprises a selecting pin UP which is hard-wired with the multiplexer MU through a link L2. The first set S1 may comprise one or several other pins. The second set S2 comprises four pins which are hard-wired with the multiplexer MU through a link L1.

The multiplexer MU is hard-wired with the interface U1 through a link L3 and hard-wired with the interface U2 through a link L4.

The writing system WS comprises a connector CO2 capable of communicating with said second set S2 by using a programming protocol. The connector CO2 is also capable of communicating with the selecting pin UP. More precisely, the connector CO2 is able to activate the selecting pin UP of the device DE. Advantageously, the connector CO2 is also able to deactivate the selecting pin UP.

The multiplexer MU is adapted to route data between the programming interface U2 and the second set S2 when the selecting pin UP is activated. The multiplexer MU is adapted to route data between the USB interface U1 and second set S2 when the selecting pin UP is not activated. Depending of state of the selecting pin UP, the multiplexer MU allows to access either the USB interface U1 or the programming interface U2. In other words, the selecting pin UP allows the writing system WS to switch the multiplexer MU to the programming mode.

In the above-described example, the USB chip CP and the multiplexer MU have been described as two distinct components. Alternatively, these two components may be merged in a single one. For instance, the multiplexer MU may be a part of an off-the-shelf chip which is able to mix USB and programming signals. Such a multiplexer may use a specific programming protocol for the programming step. In this case the programming interface may superimpose upon the USB interface at the second set S2 side.

The writing system WS may consist of a unique machine dedicated to the programming operations. Alternatively, the writing system WS may consist of two distinct machines: an adapter and a classic programming tool. For instance, the classic programming tool may be a Programming tool dedicated to the used an off-the-shelf chip and the adapter may comprise the connector CO2.

In one example, the connector CO of the device DE may be a USB 2.0 Mini B and the selecting pin UP may be the pin #4 of the connector CO. It is to be noted that the fourth pin of the USB Mini B connector is an unused pin according to the USB 2.0 specifications. (The pin #4 is "not connected" according to Table 6-2 of the USB 2.0 specifications.) There is no interference between the selecting pin UP and the second set S2 which comprises the pins #1, #2, #3 and #5.

In another example, the connector CO of the device DE may be a USB 3.0 Standard A and the selecting pin UP may be the pin #5 of the connector CO. The USB 3.0 Standard A may work in USB 3.0 mode and USB 2.0 mode. It is to be noted that the fifth pin of the USB 3.0 Standard A connector remains unused when working in USB 2.0 mode. (The pin #5 is not considered for USB 2.0 use according to Table 5-2 of the USB 3.0 specifications.) Consequently, there is no interference between the selecting pin UP and the second set S2 which comprises the pins #1 to #4 when working in USB 2.0 mode. The same way, the connector CO can be a USB 3.0 Micro A plug connector or a USB 3.0 Micro B plug connector and the selecting pin UP can be the pin #6 of the connector CO.

According to the invention, the method for programming the device DE comprises a first step of activating the selecting pin UP in order to select the programming interface U2 via the multiplexer MU. The connector CO2 sends an activation signal AC to the selecting pin UP. At a second step, programming data PD is sent from the writing system WS to the USB® chip CP through said second set S2 and through the programming interface U2.

It is to be noted that the programming data PD should be compliant with the protocol managed by the programming interface U2. Such a protocol may be a standard or a proprietary protocol.

Advantageously, the method may comprise a third step of setting the selecting pin UP in a deactivated state for selecting the USB® interface U1. The method may also comprise a fourth step of sending an USB® message to the USB® chip CP through second set S2 and through the USB® interface U1 wherein the message is fully compliant with USB protocol. Such a step allows checking if the device DE has been successfully programmed for example.

FIG. 2 shows the architecture of a USB device DE according to an embodiment of the invention. The device DE communicates with a host machine HM through the USB protocol.

The host machine HM may be any kind of machines having USB host features. For example, the host machine HM may be a personal computer, a mobile phone, a digital camera or a tablet.

The host machine HM comprises a USB host connector IN capable of communicating with the second set S2 by using the USB protocol conventionally. When working in USB 2.0 mode, the connector IN keeps the selecting pin UP unused and the second set S2 is used for accessing the USB interface U1 for exchanging messages compliant with the USB protocol.

Thanks to the invention, a large number of USB devices may be manufactured as raw devices without any data stored into these devices (i.e. empty devices). Each device may be initialized and personalized just before the delivery to a customer. These initialization and personalization operations may be carried out through the standard USB connector without opening the casing of the device. The invention eases the management of device stocks since the programming step may be performed after the manufacturing of the device.

The invention claimed is:

1. A method of programming a device, said device comprising a Universal Serial Bus connector, a multiplexer, and a USB chip, said USB connector comprising a first set of connection pins including a selecting pin and a second set of connection pins, said USB chip comprising a USB interface and a programming interface, wherein the multiplexer is configured to route data between the programming interface and said second set of connection pins when the selecting pin is active and wherein the multiplexer is configured to route data between said second set of connection pins and the USB interface when the selecting pin is idle, wherein said method comprises the following steps:
activating the selecting pin of said first set of connection pins for selecting the programming interface, and
sending programming data to the USB chip through said second set of connection pins and through the programming interface via the multiplexer.

2. A method according to claim 1, wherein the method comprises the further steps:
setting said selecting pin in a deactivated state for selecting the USB interface, and
sending an USB message to the USB chip through said second set of connection pins and through the USB interface via the multiplexer.

3. A method according to claim 1, wherein the selecting pin remains unused when the USB chip communicates with a connected host machine through the USB interface.

4. A method according to claim 1, wherein the USB connector is a USB 2.0 Mini connector and wherein the selecting pin is the fourth pin of said USB connector.

5. A method according to claim 1, wherein the selecting pin is the fifth pin of said USB connector and wherein the USB connector is a USB 3.0 Type A connector.

6. A method according to claim 1, wherein the selecting pin is the sixth pin of said USB connector and wherein the USB connector is a USB 3.0 Micro A or Micro B plug connector.

7. A device comprising a Universal Serial Bus connector and a USB chip, said USB connector comprising first and second sets of connection pins, said USB chip comprising a USB interface and a programming interface, wherein said first set comprises a selecting pin, wherein said device comprises a multiplexer able to route data between the programming interface and said second set of connection pins when the selecting pin is active, and wherein the multiplexer is able to route data between said second set of connection pins and the USB interface when the selecting pin is idle.

8. A device according to claim 7, wherein the USB connector is a USB 2.0 Mini connector and wherein the selecting pin is the fourth pin of said USB connector.

9. A device according to claim 7, wherein the selecting pin is the fifth pin of said USB connector and wherein the USB connector is a USB 3.0 Type A connector.

10. A device according to claim 7, wherein the selecting pin is the sixth pin of said USB connector and wherein the USB connector is a USB 3.0 Micro A or Micro B plug connector.

11. A writing system comprising a microprocessor and a connector, wherein said connector is configured to connect to the device of claim 7 and is adapted to activate the selecting pin and to send programming data to the USB chip through said second set of connection pins.

* * * * *